(12) United States Patent
Jhang et al.

(10) Patent No.: US 11,254,510 B2
(45) Date of Patent: Feb. 22, 2022

(54) SELF-GUIDING AND CARGO-SENSITIVE COMPONENT PLATFORM AND SYSTEM FOR TRANSFERRING COMPONENTS

(71) Applicant: SHUNSIN TECHNOLOGY (ZHONG SHAN) LIMITED, Zhongshan (CN)

(72) Inventors: Jhe-Wei Jhang, Taipei (TW); Chih-Yuan Chen, Taipei (TW); Shun-Long Lee, New Taipei (TW)

(73) Assignee: SHUNSIN TECHNOLOGY (ZHONG SHAN) LIMITED, Zhongshan (CN)

( * ) Notice: Subject to any disclaimer, the term of this patent is extended or adjusted under 35 U.S.C. 154(b) by 0 days.

(21) Appl. No.: 17/032,321

(22) Filed: Sep. 25, 2020

(65) Prior Publication Data

US 2022/0009720 A1 Jan. 13, 2022

(30) Foreign Application Priority Data

Jul. 9, 2020 (CN) .......................... 202010659205.6

(51) Int. Cl.
| | |
|---|---|
| *B65G 15/12* | (2006.01) |
| *B65G 35/06* | (2006.01) |
| *B25J 5/02* | (2006.01) |
| *B65G 1/04* | (2006.01) |

(52) U.S. Cl.
CPC ........... *B65G 35/06* (2013.01); *B65G 1/0492* (2013.01); *B65G 15/12* (2013.01); *B65G 2201/02* (2013.01)

(58) Field of Classification Search
CPC ........ B65G 15/12; B65G 35/06; B65G 41/02; B25J 5/02

USPC ......... 198/312, 348; 414/279; 700/217, 218, 700/226, 227, 228, 229
See application file for complete search history.

(56) References Cited

U.S. PATENT DOCUMENTS

| | | | | |
|---|---|---|---|---|
| 5,525,884 | A  * | 6/1996 | Sugiura | G05D 1/0261 |
| | | | | 180/168 |
| 8,972,045 | B1 * | 3/2015 | Mountz | B65G 1/1373 |
| | | | | 700/216 |
| 9,111,251 | B1 * | 8/2015 | Brazeau | G06Q 10/087 |
| 9,731,896 | B2 * | 8/2017 | Elazary | G06Q 10/087 |

(Continued)

FOREIGN PATENT DOCUMENTS

| | | |
|---|---|---|
| CN | 205003729 U | 1/2016 |
| CN | 205665586 U | 10/2016 |

(Continued)

*Primary Examiner* — Douglas A Hess
(74) *Attorney, Agent, or Firm* — ScienBiziP, P.C.

(57) ABSTRACT

A smart moving platform for transport of components in manufacturing includes a vehicle body, a transmission device, a conveying system, a detection device, a tag installation device, a control unit, and a tag reader. The conveying system conveys components. The detection device detects a location of the component and in a first predetermined area, the tag installation device installs and activates a tag on the component. The control unit writes component information to the activated tag and sets a predetermined period. The tag starts to count time elapsing, and the conveyor belt conveys the component to a second predetermined area. The tag reader reads the component information, the elapsed time, and a predetermined period of the tag. When the elapsed time matches the predetermined period, the conveying system sends the component to a third predetermined area.

18 Claims, 4 Drawing Sheets

(56) References Cited

U.S. PATENT DOCUMENTS

| | | | | |
|---|---|---|---|---|
| 9,890,025 B2* | 2/2018 | Colantonio | ......... | B66F 9/07559 |
| 9,975,148 B2* | 5/2018 | Zhu | ..................... | G06Q 10/087 |
| 10,106,383 B2* | 10/2018 | Shen | ......................... | B66F 3/08 |
| 10,317,119 B2* | 6/2019 | Zou | ......................... | F25B 49/00 |
| 10,518,800 B2* | 12/2019 | Dobell | ................. | B62D 57/024 |
| 10,821,666 B2* | 11/2020 | Hofmann | ................. | B22F 10/30 |
| 10,836,577 B2* | 11/2020 | Fryer | ..................... | B65G 1/065 |
| 10,913,612 B2* | 2/2021 | Wagner | ................. | B62D 1/283 |

FOREIGN PATENT DOCUMENTS

| | | | |
|---|---|---|---|
| CN | 107016314 | A | 8/2017 |
| CN | 206456918 | U | 9/2017 |
| CN | 206528899 | U | 9/2017 |
| CN | 107438574 | A | 12/2017 |
| CN | 109335576 | A | 2/2019 |
| CN | 109809225 | A | 5/2019 |
| CN | 110395521 | A | 11/2019 |
| WO | 2018116718 | A1 | 6/2018 |

* cited by examiner

SELF-GUIDING AND CARGO-SENSITIVE COMPONENT PLATFORM AND SYSTEM FOR TRANSFERRING COMPONENTS

FIELD

The subject matter herein generally relates to production line systems.

BACKGROUND

Automated guided vehicles (AGV) are equipped with electromagnetic or optical automatic guiding devices, capable of traveling along a predetermined path, and have safety protection and various handling functions. With the development of industrial automation, the demand for automated guided vehicles (AGV) is increased. However, in practice, the annealing time and use time of a component for each production unit are different, it is necessary to control the retention and use time of the component at each production unit. Therefore, there is room for improvement within the art.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
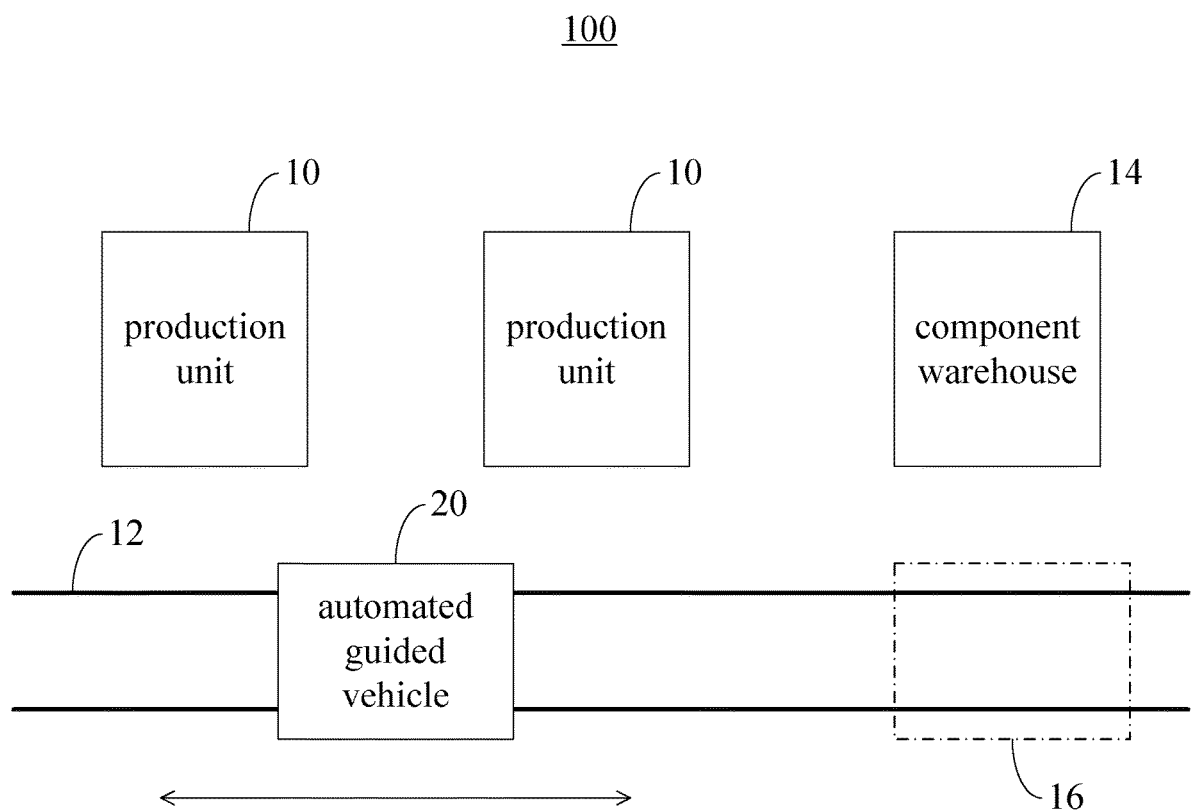
FIG. 1 is a schematic view of a system for transferring components according to an embodiment of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one".

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a schematic view of a system for transferring components (component transferring system 100) according to an embodiment of the disclosure. The component transferring system 100 according to an embodiment of the disclosure comprises production units 10, a track 12, a component warehouse 14, and an automated guided vehicle 20 that moves back and forth between production units 10 along the track 12. The automated guided vehicle 20 may obtain components from the component warehouse 14 according to the purposes of each component, and deliver the component to a target production unit 10. Finished or semi-finished products from each production unit 10 may be transported to the component warehouse 14 for storage. In FIG. 1, two production units 10 are shown as examples. In fact, the component transferring system according to the embodiments of the disclosure can be applied to more than two production units according to actual needs.

According to another embodiment of the disclosure, the automated guided vehicle 20 further comprises a battery module (not shown in the figure) set on the bottom of the automated guided vehicle 20. The track 12 passes through a charging area 16. There is a charging module in the charging area 16. When the automated guided vehicle 20 stays or passes through the charging area 16, the charging module charges the battery module of the automated guided vehicle 20 in a wired or wireless manner. The embodiment shown in FIG. 1 shows the automated guided vehicle 20 moving along the track 12. In other embodiments, the automated guided vehicle 20 can also move among the production units 10 and the component warehouse 14 tracklessly, that is, not being restricted by a track. In addition, the location and number of charging areas 16 shown in FIG. 1 are only examples, and those skilled in the art can set one or more charging areas 16 in specific areas of the assembly line according to actual needs.

Figure 2:
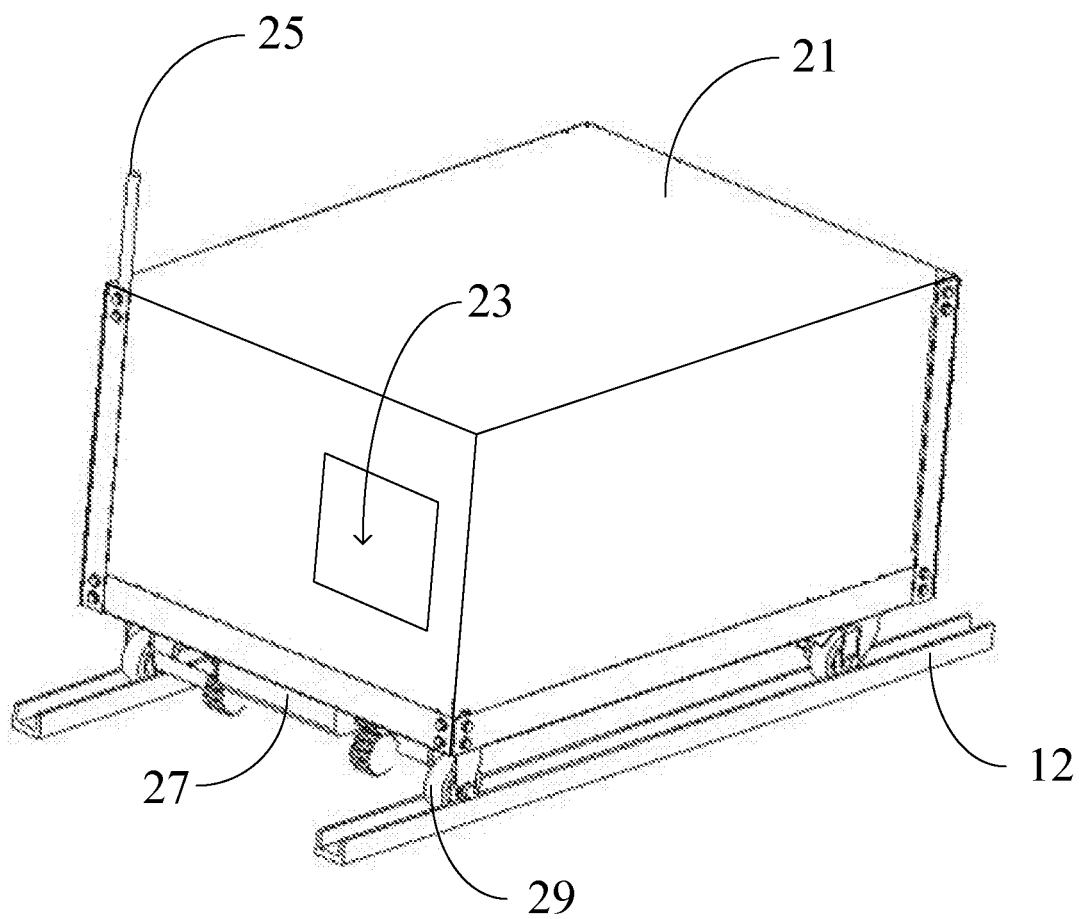
FIG. 2 is a perspective view of an automated guided vehicle according to an embodiment of the disclosure.

FIG. 2 illustrates a perspective view of the automated guided vehicle according to an embodiment of the disclosure. As shown in FIG. 2, the automated guided vehicle 20 according to an embodiment of the disclosure comprises a vehicle body 21, a feed inlet 23, an antenna module 25, and a transmission device 27. The vehicle body 21 has a feed inlet 23 for receiving components for carriage. According to an embodiment of the disclosure, the components can be put into the automated guided vehicle 20 through the feed inlet 23 by manual or industrial robots. The antenna module 25 receives movement instructions. The movement instructions may be provided by a remote device. For example, the movement instruction is issued by a user through a terminal device, or by a control center according to a predetermined setting.

According to an embodiment of the disclosure, the terminal device may be a user terminal, user equipment (UE), a terminal, a wireless communication device, a user agent, or a user device. The terminal device can also be a cellular phone, a wireless phone, a session initiation protocol (SIP) phone, a wireless local loop (WLL) station, a personal digital assistant (PDA), a hand-held device, a computing device or other processing devices with wireless communication functions, a vehicle-mounted device, a wearable device (such as a smart watch), a laptop computer, or a desktop computer, etc.

According to an embodiment of the disclosure, the automated guided vehicle further comprises a transmission device 27, such as a motor, for driving the roller 29 to make the automated guided vehicle 20 move on the track 12. The antenna module 25 may include a mobile communication module and a wireless communication module. The mobile communication module can provide wireless communication solutions including 2G/3G/4G/5G and other wireless communication to communicate with terminal equipment. The mobile communication module can receive radio waves by the antenna 25, filter and amplify the radio waves, and transmit the waves to a processor for demodulation.

The wireless communication module can provide wireless local area networks (WLAN), WI-FI networks, BLU-ETOOTH (BT), and global navigation satellite systems (GNSS), frequency modulation (FM), near field communication (NFC), infrared technology (IR) and other wireless communication solutions for contacting terminal equipment. In addition, the automated guided vehicle according to an embodiment of the disclosure can be applied to the long term evolution vehicle-to-everything (LTE-V2X), the new radio vehicle-to-everything (NR-V2X), or 5th generation vehicle-to-everything (5G-V2X) in the future.

According to an embodiment of the disclosure, the automated guided vehicle 20 further comprises a variety of sensors, including temperature sensors, humidity sensors, air pressure sensors, odor sensors, ambient light sensors, etc., to detect information as to the environment around the automated guided vehicle 20. The automated guided vehicle 20 may also comprise gyroscope sensors, magnetic sensors, acceleration sensors, distance sensors, or proximity light sensors, to detect the state of the automated guided vehicle 20 itself and the interaction with the external environment. The automated guided vehicle 20 may also comprise pressure sensors, fingerprint sensors, or touch sensors, to detect the user's control commands to the automated guided vehicle 20. In addition, the automated guided vehicle 20 further comprises a position sensor and a weight sensor for detecting the state of the components carried by the automated guided vehicle 20. It is noted that the sensor types listed above are only examples, and those skilled in the art can configure their functional sensors according to actual needs.

Figure 3:
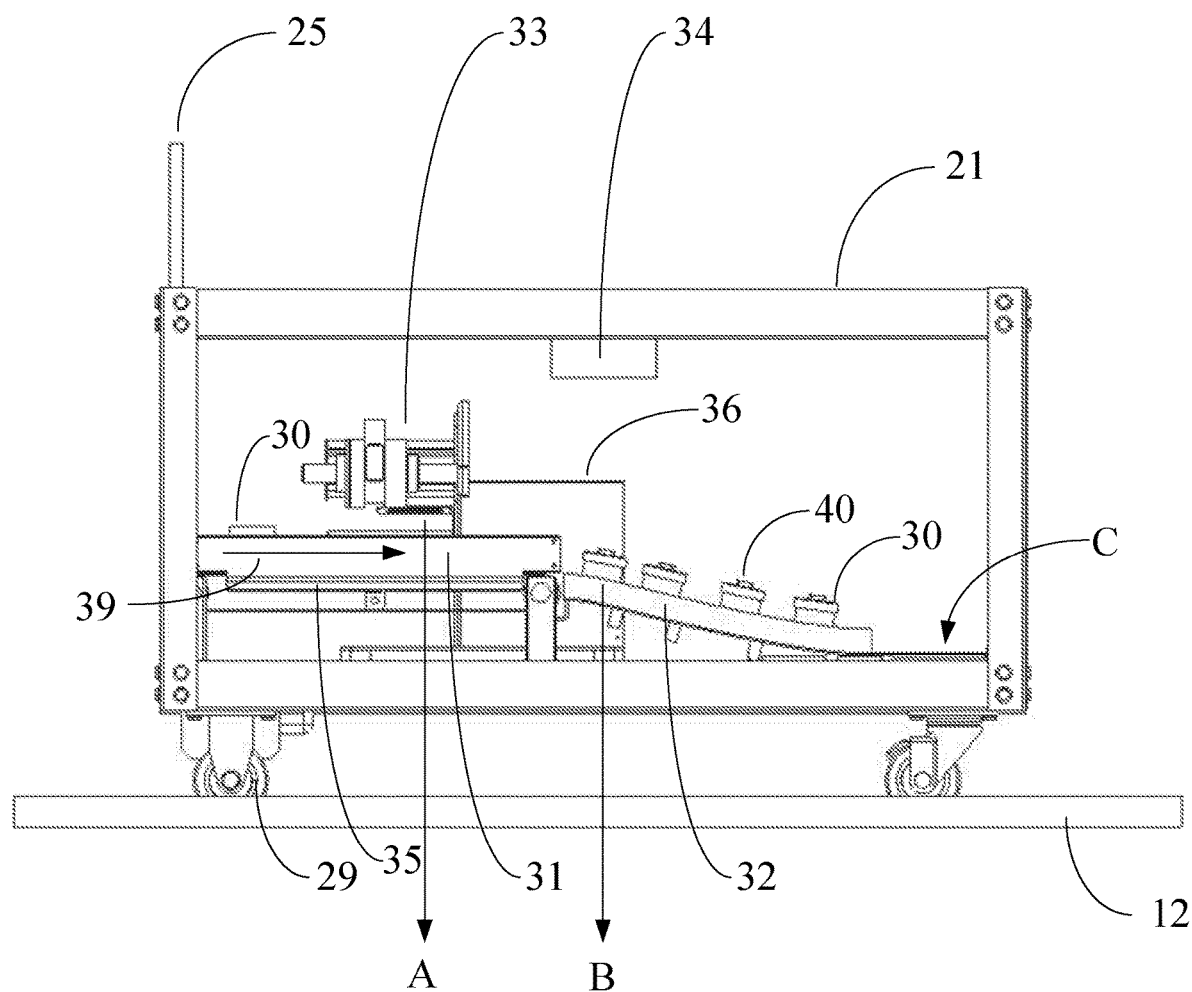
FIG. 3 is a side view of the automated guided vehicle according to an embodiment of the disclosure.
Figure 4:
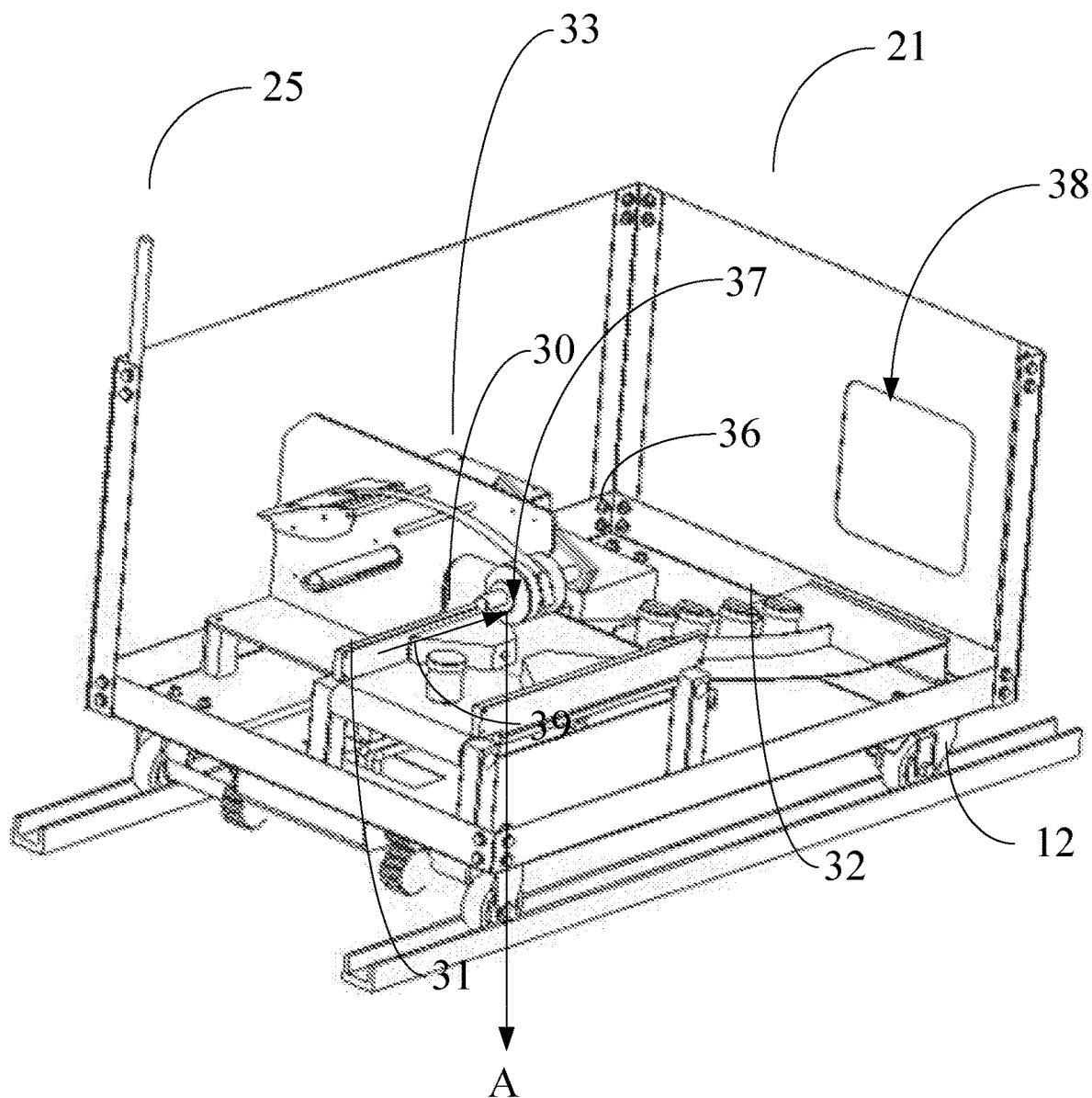
FIG. 4 is a schematic view of the automated guided vehicle of FIG. 2.

FIG. 3 illustrates a side view of the automated guided vehicle according to an embodiment of the disclosure, and FIG. 4 illustrates a schematic view of the automated guided vehicle of FIG. 2. In FIGS. 3 and 4, for the convenience of description, part of the vehicle body 21 is transparent to show the internal structure of the automated guided vehicle 20. As shown in FIGS. 3 and 4, the automated guided vehicle 20 according to an embodiment of the disclosure comprises a conveyor belt 31, a sliding rail 32, a tag installation device 33, a tag reader 34, and a control unit 36.

The control unit 36 may comprise one or more processing units, such as an application processor (AP), a modulation or demodulation processor, a graphics processing unit (GPU), an image signal processor (ISP), a controller, a video encoder or decoder, a digital signal processor (DSP), a baseband processor, or a neural-network processing unit (NPU), etc. Different processing units may be independent components, or integrated in one or more processors. The control unit 36 can generate operation control signals according to the instruction operation code and timing signals, and complete the control of fetching and executing instructions. In some other embodiments, a storage device may be provided in the control unit 36 to store instructions and data. For example, the storage device in the control unit 36 may be a cache memory. The storage device can store instructions or data that the control unit 36 has just used or recycled. If the control unit 36 needs to use the instruction or data again, the instructions or data can be accessed from the storage device.

The conveyor belt 31 is installed on the car body 21 and has a sensor 35 (third detection device). In an embodiment, the sensor 35 can be a weight sensor to detect whether there is a component 30 on the conveyor belt 31. When the sensor 35 detects that the weight of an object on the conveyor belt 31 exceeds a predetermined value (for example, 100 grams), it means that the component 30 has been placed on the conveyor belt 31 from the feed inlet 23, and the sensor 35 (third detection device) outputs a fourth control signal to the control unit 36. The control unit 36 triggers the conveyor belt 31 to convey the component 30 according to the fourth control signal, and conveys the component 30 to the first predetermined area A along the moving direction 39.

In FIG. 4, the sensor 37 (first detection device) is positioned in the first predetermined area A to detect the position of the component 30. When the component 30 is delivered to the first predetermined area A by the conveyor belt 31, the sensor 37 outputs the first control signal to the control unit 36. The control unit 36 drives the tag installation device 33 according to the first control signal. According to an embodiment of the disclosure, the sensor 37 may be a proximity sensor, an infrared sensor or a light blocking sensor.

Referring FIG. 3, the triggered tag installation device 33 attaches the tag 40 to the component 30. FIG. 3 shows the component 30 without the tag 40, before the component 30 has passed through the tag installation device 33. After being processed by the tag installation device 33, the component 30 on the slide rail 32 has been attached with the tag 40. According to an embodiment of the disclosure, the tag 40 has a communication chip, a sensor, and an activation switch. When the tag installation device 33 installs the tag 40 on the component 30, the tag installation device 33 simultaneously presses the activation switch to activate the tag 40. Thus, the tag 40 is in a readable and writable state. Next, the control unit 36 writes the component information and information of a predetermined period to the activated tag 40 through a tag writing tool (not shown in the figure), and then the tag 40 is driven by the conveyor belt 31 to the second predetermined area B. At the same time, the smart tag 40 starts counting time elapsing. The second predetermined area B is located at the slide rail 32, and the slide rail 32 is provided with a sensor (the second detection device, not shown) in the second predetermined area B to detect the position of the component 30. When the component 30 is detected in the second predetermined area B, the sensor (second detection device) outputs a third control signal to the control unit 36. According to an embodiment, the sensor (the second detecting device) located in the second predetermined area B may be a proximity sensor, an infrared sensor, or a light blocking sensor.

The sliding rail 32 has a latch located in the second predetermined area B, and the preset state of the latch is retracted under the sliding surface of the sliding rail 32. When the control unit 36 receives the third control signal, the control unit 36 triggers the latch according to the third control signal to block the component 30 from moving on the slide rail 32. In an embodiment of the disclosure, the latch is a tenon, and the tenon is protruding from the sliding surface of the sliding rail 32 to block the component 30, so that the component 30 cannot slide down. It is noted that the use of the tenon in this embodiment is only an example, and those skilled in the art can use other methods to make the material 30 stay in the second predetermined area B of the slide rail 32.

When the component 30 stays in the second predetermined area B of the slide rail 32, the tag reader 34 reads the component information, the elapsed time, and the information of the predetermined period of the tag 40. Since the tag 40 continues to accumulate and count time elapsing, when the elapsed time matches the predetermined period, the tag reader 34 outputs a second control signal to the control unit 36. When the control unit 36 receives the second control signal, the latch is triggered by the control unit 36 according to the second control signal to retract below the sliding surface of the sliding rail 32, so that the component 30 is released and is able to move from the second predetermined area B to the third predetermined area C. The third predetermined area C is a component temporary storage area, and from there the component 30 can be taken out from the automated guided vehicle 20 through the component outlet 38. According to the embodiment of the disclosure, the component 30 can be taken out from the automated guided vehicle 20 through the component outlet 38 by manual or industrial robot.

According to the embodiment of the disclosure, the tag 40 may also have environmental detection sensors, including temperature sensors, humidity sensors, air pressure sensors, odor sensors, or ambient light sensors, to detect environmental information around the tag 40. The environment information on the assembly line can be collected through the environment detection sensors of the automated guided vehicle 20 and the tag 40. When the information as to the environment shows an abnormal state, which exceeds a threshold, these sensors may provide the abnormal information to the control unit 36, and the control unit 36 may notify a content management system or cloud server through the antenna 25 for data management. It is noted that the detailed structures and internal circuits of the tag installation device 33, the tag writing tool, the tag reader 34, and the tag 40 described in the embodiment of the disclosure are wholly conventional and will be fully appreciated by those of ordinary skill in the art.

The automated guided vehicle according to an embodiment of the disclosure can transport components between production units. In addition, the automated guided vehicle can control the time of occupation and use time of components at different stages by tags, a tag installation device, and a tag reader. Moreover, replacing the manual installation of tags with a tag installation system can improve the automation of the assembly line. In addition, the component transferring system according to the embodiment of the disclosure is equipped with environment detection sensors on the automated guided vehicle and tags, which can instantly and accurately monitor whether the environment is abnormal and/or requires action, ensuring product yield and improving assembly line safety.

Many details are often found in the relevant art, thus many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An automated guided vehicle for an assembly line, comprising:
    a vehicle body having a feed inlet;
    a transmission device;
    a conveying system installed on the vehicle body, and having a conveyor belt for receiving and conveying a component from the feed inlet through a first predetermined area, a second predetermined area to a third predetermined area;
    a first detection device detecting a location of the component, and generating a first control signal when the component is located in the first predetermined area;
    a tag installation device installing a tag on the component and activating the tag according to the first control signal;
    a control unit controlling the transmission device according to a movement instruction to move the vehicle body, writing component information and information of a predetermined period to the activated tag, wherein the tag starts to count an elapsed time in response to the writing of the information of the predetermined period, and the conveyor belt conveys the component to the second predetermined area; and
    a tag reader reading the component information, the elapsed time, and the information of the predetermined period of the tag, and generating a second control signal when the elapsed time matches the predetermined period, wherein the conveying system sends the component from the second predetermined area to the third predetermined area according to the second control signal.

2. The automated guided vehicle of claim 1, further comprising a second detection device detecting the location of the component, and generating a third control signal when the component is located in the second predetermined area.

3. The automated guided vehicle of claim 2, wherein the conveying system further comprises a slide rail, the slide rail has a latch located in the second predetermined area, and the control unit triggers the latch according to the third control signal to block the component from moving on the slide rail, and triggers the latch according to the second control signal to release the component, so that the component moves from the second predetermined area to the third predetermined area.

4. The automated guided vehicle of claim 1, further comprising a second detection device detecting the location of the component, and generating a third control signal when the component is located on the conveyor belt, wherein the control unit triggers the conveyor belt to convey the component according to the third control signal.

5. The automated guided vehicle of claim 1, wherein the tag installation device attaches the tag to the component according to the first control signal, and presses a switch of the tag to activate the tag.

6. The automated guided vehicle of claim 1, wherein the assembly line comprises a plurality of production units and a track passing through the production units, the control unit controls the transmission device to move the vehicle body along the track according to the movement instruction, and the movement instruction is provided by a remote device.

7. The automated guided vehicle of claim 6, further comprising a battery module attached on the vehicle body, wherein the track passes through a charging area, and a charging module located in the charging area charges the battery module when the vehicle body passes through the charging area.

8. The automated guided vehicle of claim 6, further comprising an antenna module for receiving the movement instruction.

9. The automated guided vehicle of claim 6, wherein the tag further comprises a third detecting device for detecting environmental data of the component, and generating a third control signal when the environmental data is abnormal, and the control unit transmits the environmental data to a content management system through the antenna module according to the third control signal.

10. A component transferring system, comprising:
an automated guided vehicle, comprising:
a vehicle body having a feed inlet;
a transmission device;
a conveying system installed on the vehicle body, and having a conveyor belt for receiving and conveying a component from the feed inlet through a first predetermined area, a second predetermined area to a third predetermined area;
a first detection device detecting a location of the component, and generating a first control signal when the component is located in the first predetermined area;
a tag installation device installing a tag on the component and activating the tag according to the first control signal;
a control unit controlling the transmission device according to a movement instruction to move the vehicle body, writing component information and information of a predetermined period to the activated tag, wherein the tag starts to count an elapsed time in response to the writing of the information of the predetermined period, and the conveyor belt conveys the component to the second predetermined area; and
a tag reader reading the component information, the elapsed time, and the information of the predetermined period of the tag, and generating a second control signal when the elapsed time matches the predetermined period, wherein the conveying system sends the component from the second predetermined area to the third predetermined area according to the second control signal;
a plurality of production units; and
a track passing through the production units, wherein the control unit controls the transmission device to move the vehicle body along the track according to the movement instruction.

11. The component transferring system of claim 10, further comprising a second detection device detecting the location of the component, and generating a third control signal when the component is located in the second predetermined area.

12. The component transferring system of claim 11, wherein the conveying system further comprises a slide rail, the slide rail has a latch located in the second predetermined area, and the control unit triggers the latch according to the third control signal to block the component from moving on the slide rail, and triggers the latch according to the second control signal to release the component, so that the component moves from the second predetermined area to the third predetermined area.

13. The component transferring system of claim 10, further comprising a second detection device detecting the location of the component, and generating a third control signal when the component is located on the conveyor belt, wherein the control unit triggers the conveyor belt to convey the component according to the third control signal.

14. The component transferring system of claim 10, wherein the tag installation device attaches the tag to the component according to the first control signal, and presses a switch of the tag to activate the tag.

15. The component transferring system of claim 10, wherein the movement instruction is provided by a remote device.

16. The component transferring system of claim 10, further comprising a battery module attached on the vehicle body, wherein the track passes through a charging area, and a charging module located in the charging area charges the battery module when the vehicle body passes through the charging area.

17. The component transferring system of claim 10, further comprising an antenna module for receiving the movement instruction.

18. The component transferring system of claim 17, wherein the tag further comprises a third detecting device for detecting environmental data of the component, and generating a third control signal when the environmental data is abnormal, and the control unit transmits the environmental data to a content management system through the antenna module according to the third control signal.

* * * * *